(12) United States Patent
Xu et al.

(10) Patent No.: US 12,556,987 B2
(45) Date of Patent: Feb. 17, 2026

(54) SIGNALING EFFICIENCY IMPROVEMENTS IN NON-TERRESTRIAL NETWORKS

(71) Applicant: Nokia Technologies Oy, Espoo (FI)

(72) Inventors: Xiang Xu, Nanjing (CN); Jeroen Wigard, Klarup (DK); István Z. Kovács, Aalborg (DK); Mads Lauridsen, Gistrup (DK); Ping Yuan, Beijing (CN)

(73) Assignee: Nokia Technologies Oy, Espoo (FI)

( * ) Notice: Subject to any disclaimer, the term of this patent is extended or adjusted under 35 U.S.C. 154(b) by 409 days.

(21) Appl. No.: 17/906,441

(22) PCT Filed: Mar. 26, 2020

(86) PCT No.: PCT/CN2020/081424
§ 371 (c)(1),
(2) Date: Sep. 15, 2022

(87) PCT Pub. No.: WO2021/189359
PCT Pub. Date: Sep. 30, 2021

(65) Prior Publication Data
US 2023/0135073 A1 May 4, 2023

(51) Int. Cl.
*H04W 36/00* (2009.01)

(52) U.S. Cl.
CPC ............ *H04W 36/00837* (2018.08); *H04W 36/0058* (2018.08); *H04W 36/00835* (2018.08)

(58) Field of Classification Search
CPC ......... H04W 36/0058; H04W 36/0061; H04W 36/00835; H04W 36/00837; H04W 36/0085; H04W 48/12; H04W 48/16
See application file for complete search history.

(56) References Cited

U.S. PATENT DOCUMENTS

| | | | |
|---|---|---|---|
| 10,757,618 B2* | 8/2020 | Kim | H04W 36/0058 |
| 11,917,468 B2* | 2/2024 | Chen | H04W 48/16 |
| 11,930,416 B2* | 3/2024 | Säily | H04W 12/0431 |

(Continued)

FOREIGN PATENT DOCUMENTS

| | | |
|---|---|---|
| CN | 104852761 A | 8/2015 |
| CN | 110326327 A | 10/2019 |

(Continued)

OTHER PUBLICATIONS

Office action received for corresponding Vietnamese Patent Application No. 1-2022-06310, dated Sep. 5, 2024, 2 pages of office action and 2 pages of office action translation available.

(Continued)

*Primary Examiner* — Wutchung Chu
(74) *Attorney, Agent, or Firm* — Nokia Technologies Oy

(57) ABSTRACT

A base station serving UE(s) receives validity time information for cell(s) formed by other base station(s). The validity time information indicates at least a time period when corresponding cells are available for use by the UE(s). The base station determines action(s) to perform for the UE(s) based on the validity time information. A UE receives, from a base station, validity time for cell(s) formed by other base station(s). The UE performs action(s) based on the validity time of the cell(s).

16 Claims, 12 Drawing Sheets

(56) References Cited

U.S. PATENT DOCUMENTS

| | | | |
|---|---|---|---|
| 2013/0225120 A1* | 8/2013 | Hietalahti | H04W 4/021 455/404.2 |
| 2016/0323799 A1* | 11/2016 | Morgan | H04W 4/12 |
| 2017/0005706 A1* | 1/2017 | Khoshnevisan | H04L 1/0026 |
| 2019/0037338 A1 | 1/2019 | Edge et al. | |
| 2019/0141573 A1 | 5/2019 | Bostrom et al. | |
| 2019/0245614 A1* | 8/2019 | Lucky | H04B 7/2041 |
| 2019/0335367 A1* | 10/2019 | Yue | H04W 36/0016 |
| 2020/0053690 A1 | 2/2020 | Fischer et al. | |
| 2020/0296649 A1* | 9/2020 | Dudzinski | H04W 64/006 |
| 2020/0314914 A1* | 10/2020 | Roy | H04B 7/18541 |
| 2021/0029598 A1* | 1/2021 | Wigard | H04B 7/18541 |
| 2022/0007455 A1* | 1/2022 | Hong | H04L 1/1883 |
| 2022/0039026 A1* | 2/2022 | Sharma | H04W 52/242 |
| 2022/0116844 A1* | 4/2022 | Qiao | H04W 48/20 |
| 2023/0049998 A1* | 2/2023 | Li | H04W 72/1268 |

FOREIGN PATENT DOCUMENTS

| | | | |
|---|---|---|---|
| EP | 2688348 A1 | 1/2014 | |
| EP | 2995119 B1 * | 4/2017 | H04W 36/0064 |
| GB | 2587651 A | 4/2021 | |
| JP | 2012-005093 A | 1/2012 | |
| JP | 2015-529042 A | 10/2015 | |
| WO | 2018/052744 A2 | 3/2018 | |
| WO | 2018/111876 A1 | 6/2018 | |
| WO | 2018/156696 A1 | 8/2018 | |
| WO | 2019/166686 A1 | 9/2019 | |

OTHER PUBLICATIONS

Office action received for corresponding Indonesian Patent Application No. P00202211344, dated Sep. 27, 2024, 2 pages of office action and 2 pages of office action translation available.

Office action received for corresponding Vietnamese Patent Application No. 1-2022-06310, dated Nov. 4, 2022, 2 pages of office action and 1 page of translation available.

Office action received for corresponding Indian Patent Application No. 202247060872, dated Jan. 11, 2023, 8 pages.

Office action received for corresponding Japanese Patent Application No. 2022-557803, dated Sep. 12, 2023, 3 pages of office action and 5 pages of translation available.

"Signalling Delay in NTN", 3GPP TSG-RAN WG2 Meeting #106, R2-1907994, Agenda: 11.6.4.1.1, LG Electronics Inc., May 13-17, 2019, pp. 1-3.

Extended European Search Report received for corresponding European Patent Application No. 20927531.2, dated Nov. 20, 2023, 13 pages.

Office action received for corresponding Japanese Patent Application No. 2022-557803, dated Feb. 13, 2024, 2 pages of office action and 7 pages of summary available.

Office action received for corresponding Chinese Patent Application No. 202080100238.5, dated Jun. 25, 2024, 7 pages of office action and 5 pages of office action translation available.

Office action received for corresponding Japanese Patent Application No. 2022-557803, dated Jun. 25, 2024, 2 pages of office action and no page of translation available.

"Solutions for NR to support non-terrestrial networks (NTN)", 3GPP TSG RAN meeting #86, RP-193234, Agenda: 9.1.2, Thales, Dec. 9-13, 2019, 10 pages.

"3rd Generation Partnership Project; Technical Specification Group Radio Access Network; Solutions for NR to support non-terrestrial networks (NTN) (Release 16)", 3GPP TR 38.821, V16.0.0, Dec. 2019, pp. 1-140.

"Switching the Feeder Link Toward the Satellite", 3GPP TSG-RAN WG3 #103bis, R3-191767, Agenda: 20.2.4.4, Ericsson, Apr. 8-12, 2019, 8 pages.

"3rd Generation Partnership Project; Technical Specification Group Radio Access Network; NG-RAN; Xn application protocol (XnAP) (Release 16)", 3GPP TS 38.423, V16.0.0, Dec. 2019, pp. 1-330.

"3rd Generation Partnership Project; Technical Specification Group Radio Access Network; NR; Radio Resource Control (RRC) protocol specification (Release 15)", 3GPP TS 38.331, V15.8.0, Dec. 2019, pp. 1-532.

International Search Report and Written Opinion received for corresponding Patent Cooperation Treaty Application No. PCT/CN2020/081424, dated Dec. 28, 2020, 8 pages.

"Considerations on CHO in NTN", 3GPP TSG-RAN WG2 Meeting #107, R2-1911295, Agenda: 11.6.4.1.2, LG Electronics Inc, Aug. 26-30, 2019, pp. 1-3.

"TP on NTN Mobility issues and solutions", 3GPP RAN WG2 Meeting #107, R2-1910962, Agenda: 11.6.4.1, InterDigital, Aug. 26-30, 2019, 4 pages.

Rejection Decision received for corresponding Chinese Patent Application No. 202080100238.5, dated Nov. 22, 2024, 6 pages of rejection decision and 6 pages of translation available.

* cited by examiner

| IE/Group Name | Presence | Range | IE type and reference | Semantics description | Criticality | Assigned Criticality |
|---|---|---|---|---|---|---|
| NR-PCI | M | | INTEGER (0..1007, ...) | NR Physical Cell ID | – | |
| NR CGI | M | | 9.2.2.7 | | – | |
| TAC | M | | 9.2.2.5 | Tracking Area Code | – | |
| RANAC | O | | RAN Area Code 9.2.2.6 | | – | |
| ... | | | | | | |
| Validity Time Information List | O | | | Contains the validity period for this cell. | – | |
| >Validity Time Information Item | | 1..<maxnoofValTime> | | | – | |
| >Validity window start | M | | OCTET STRING (SIZE(4)) | UTC time for the start of the 1st validity window | – | |
| >Validity window end | M | | OCTET STRING (SIZE(4)) | UTC time for the end of the 1st validity window | – | |
| >Validity Period | M | | BIT STRING (SIZE(36)) | Period to the start of the next validity window | – | |

FIG. 7

SIGNALING EFFICIENCY IMPROVEMENTS IN NON-TERRESTRIAL NETWORKS

RELATED APPLICATION

This application was originally filed as PCT Application No. PCT/CN2020/081424, filed on Mar. 26, 2020, which is incorporated herein by reference in its entirety.

The exemplary and non-limiting embodiments of the invention relate generally to cellular communications in Terrestrial Networks (TNs) and Non-Terrestrial Networks (NTNs). The exemplary and non-limiting embodiments of the invention relate to signaling in those networks.

BACKGROUND

A cellular network can be and is typically a Terrestrial Network (TN), meaning the cellular network is on the Earth. However, there has been increasing interest and participation in 3GPP from the satellite communication industry, with interest for an integrated satellite (Non-Terrestrial Network, NTN) and TN infrastructure in the context of, e.g., 5G.

The roles and benefits of satellites in 5G have been and are being studied and there is a recognition that, in certain situations, there is an added value that satellite coverage brings. For instance, in industrial applications, where ubiquitous coverage is crucial, NTN can be beneficial. Satellites refer to spaceborne vehicles in a number of different orbits: Low Earth Orbits (LEO); Medium Earth Orbits (MEO); Geostationary Earth Orbit (GEO); or Highly Elliptical Orbits (HEO).

In addition to satellites, NTNs may also refer to networks, or segments of networks, using an airborne or spaceborne vehicle for transmission. Airborne vehicles refer to, for instance, High Altitude Platforms (HAPs) encompassing Unmanned Aircraft Systems (UAS)—including tethered UAS, Lighter than Air UAS and Heavier than Air UAS—operating at altitude, typically between 8 and 50 km, quasi-stationary.

Even if a User Equipment (UE), which connects to the cellular network, is stationary, the NTN may not be. That is, a particular geographical area might be covered by different parts of the NTN at different times.

BRIEF SUMMARY

This section is intended to include examples and is not intended to be limiting.

In an exemplary embodiment, a method includes receiving, at a base station serving one or more user equipment, validity time information for one or more cells formed by one or more other base stations. The validity time information indicates at least a time period when corresponding cells are available for use by the one or more user equipment. The method includes determining one or more actions to perform for the one or more user equipment based on the validity time information.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus to perform operations comprising: receiving, at a base station serving one or more user equipment, validity time information for one or more cells formed by one or more other base stations, the validity time information indicating at least a time period when corresponding cells are available for use by the one or more user equipment; and determining one or more actions to perform for the one or more user equipment based on the validity time information.

An exemplary computer program product includes a computer-readable storage medium bearing computer program code embodied therein for use with a computer. The computer program code includes: code for receiving, at a base station serving one or more user equipment, validity time information for one or more cells formed by one or more other base stations, the validity time information indicating at least a time period when corresponding cells are available for use by the one or more user equipment; and code for determining one or more actions to perform for the one or more user equipment based on the validity time information.

In another exemplary embodiment, an apparatus comprises means for performing: receiving, at a base station serving one or more user equipment, validity time information for one or more cells formed by one or more other base stations, the validity time information indicating at least a time period when corresponding cells are available for use by the one or more user equipment; and determining one or more actions to perform for the one or more user equipment based on the validity time information.

A further exemplary embodiment is a method comprising receiving, at a user equipment from a base station, validity time for one or more cells formed by one or more other base stations. The method also includes performing by the user equipment one or more actions based on the validity time of the one or more cells.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus to perform operations comprising: receiving, at a user equipment from a base station, validity time for one or more cells formed by one or more other base stations; and performing by the user equipment one or more actions based on the validity time of the one or more cells.

An exemplary computer program product includes a computer-readable storage medium bearing computer program code embodied therein for use with a computer. The computer program code includes: code for receiving, at a user equipment from a base station, validity time for one or more cells formed by one or more other base stations; and performing by the user equipment one or more actions based on the validity time of the one or more cells.

In another exemplary embodiment, an apparatus comprises means for performing: receiving, at a user equipment from a base station, validity time for one or more cells formed by one or more other base stations; and performing by the user equipment one or more actions based on the validity time of the one or more cells.

BRIEF DESCRIPTION OF THE DRAWINGS

In the attached Drawing Figures:

FIG. 7 shows a portion of the information element for Served Cell Information NR, in an exemplary embodiment;

DETAILED DESCRIPTION OF THE DRAWINGS

Figure 1:
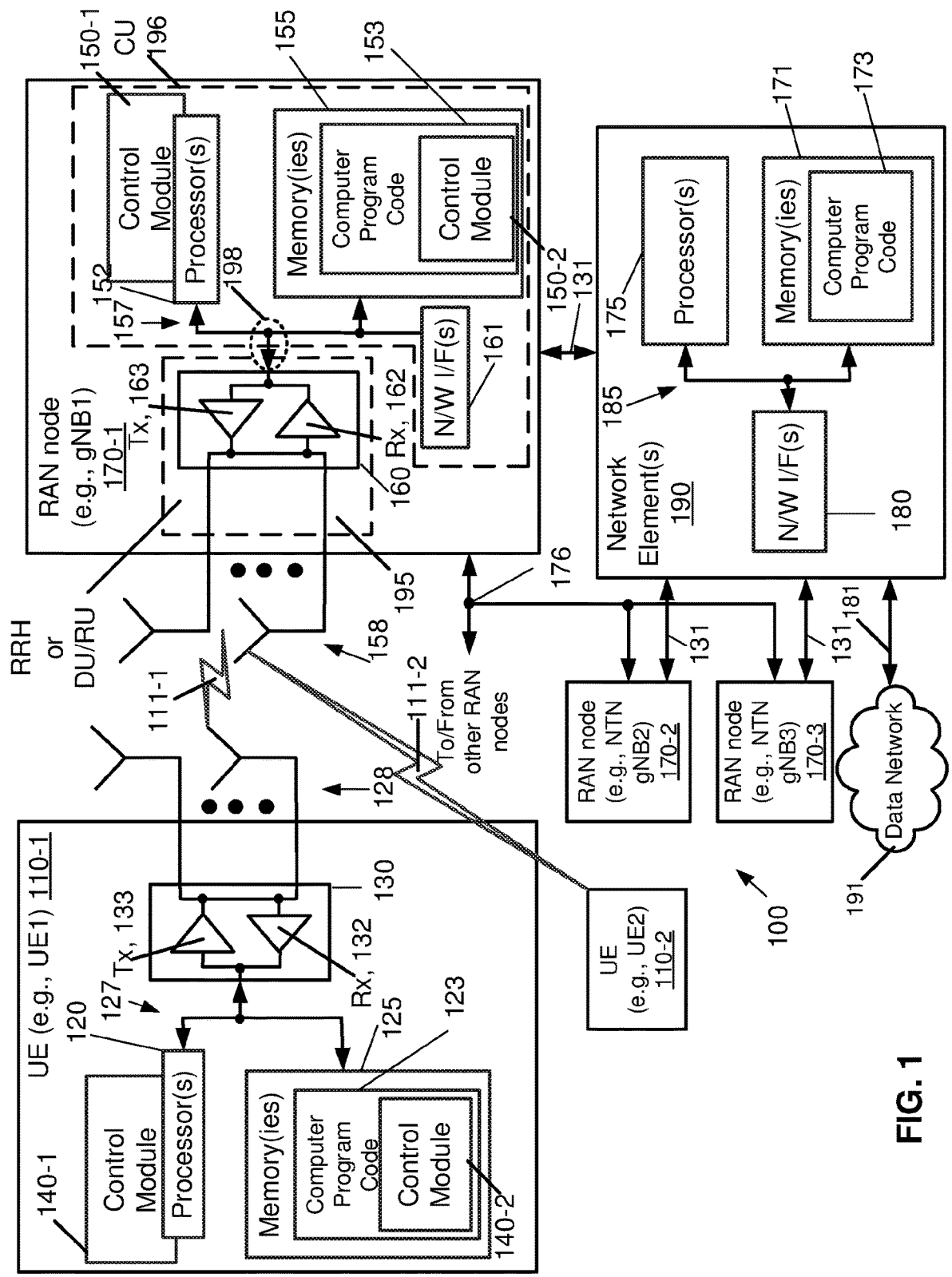
FIG. 1 is a block diagram of one possible and non-limiting exemplary system in which the exemplary embodiments may be practiced.

Abbreviations that may be found in the specification and/or the drawing figures are defined below, at the end of the detailed description section.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for signaling efficiency in non-terrestrial networks. Additional description of these techniques is presented after a system into which the exemplary embodiments may be used is described.

Turning to FIG. 1, this figure shows a block diagram of one possible and non-limiting exemplary system in which the exemplary embodiments may be practiced. User equipment (UE) 110 (110-1 and 110-2), radio access network (RAN) nodes 170-1, 170-2 and 170-3, and network element(s) 190 are illustrated. In FIG. 1, each UE 110 is in wireless communication with a wireless (e.g., cellular) network 100. A UE is a wireless, typically mobile device that can access a wireless network. In this example, two UEs 110-1 and 110-2 are illustrated. The UEs will be referred to in subsequent figures as UE1 110-1 and UE2 110-2. An individual UE will be referred to as UE 110, and the description below of possible internal UE structure is applicable to both UEs 110-1 and 110-2.

The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a control module 140, comprising one of or both parts 140-1 and/or 140-2, which may be implemented in a number of ways. The control module 140 may be implemented in hardware as control module 140-1, such as being implemented as part of the one or more processors 120. The control module 140-1 may be implemented also as an integrated circuit or through other hardware such as a programmable gate array. In another example, the control module 140 may be implemented as control module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UEs 110-1 and 110-2 communicates with RAN node 170 via a respectively wireless link 111-1 and 111-2. Note that the UEs 110 may also communicate via similar links to the RAN nodes 170-2 and 170-3, but these links are not shown.

There are three RAN nodes 170-1, 170-2 and 170-3 that are shown. Each of these RAN nodes 170 is considered to be a gNB in later examples, although this is only one possibility as described below. Additionally, in conformance with examples provided below, the RAN node (e.g., gNB1) 170-1 is assumed to be a Terrestrial Network (TN) node or a Non-Terrestrial Network (NTN) node, and the RAN node (e.g., gNB2) 170-2 and RAN node (e.g., gNB3) 170-3 are assumed to be NTN nodes, but this is merely exemplary. An individual RAN node will be referred to as RAN node 170, and the description below of possible internal structure of a RAN node is applicable to the three RAN nodes 170-1, 170-2, and 170-3.

The RAN node 170 is a base station that provides access by wireless devices such as the UE 110 to the wireless network 100. The RAN node 170 may be, for instance, a base station for 5G, also called New Radio (NR), or any other wireless communication base station. In 5G, the RAN node 170 may be a NG-RAN node, which is defined as either a gNB or an ng-eNB. A gNB is a node providing NR user plane and control plane protocol terminations towards the UE, and connected via the NG interface to a 5GC (e.g., the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a control module 150, comprising one of or both parts 150-1 and/or 150-2, which may be implemented in a number of ways. The control module 150 may be implemented in hardware as control module 150-1, such as being implemented as part of the one or more processors 152. The control module 150-1 may be implemented also as an integrated circuit or through other hardware such as a programmable gate array. In another example, the control module 150 may be implemented as control module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the control module 150 may be distributed, such as being distributed between the DU 195 and the CU 196, or be implemented solely in the DU 195.

The one or more network interfaces 161 communicate over a network such as via the links 176 and 131. Two or more RAN nodes 170 communicate using, e.g., link 176. The link 176 may be wired or wireless or both and may implement, e.g., an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, e.g., fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that the base station that forms the cell will perform the functions. The cell makes up part of a base station. That is, there can be multiple cells per base station. For instance, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a data network 191, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN nodes 170 are coupled via links 131 to a network element 190. The links 131 may be implemented as, e.g., NG interfaces for 5G, or S1 interfaces for LTE, or other suitable interfaces for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, vehicles with a modem device for wireless V2X (vehicle-to-everything) communication, image capture devices such as digital cameras having wireless communication capabilities, gaming devices having wireless communication capabilities, music storage and playback appliances having wireless communication capabilities, Internet appliances (including Internet of Things, IoT, devices) permitting wireless Internet access and possibly browsing, IoT devices with sensors and/or actuators for automation applications with wireless communication tablets with wireless communication capabilities, as well as portable units or terminals that incorporate combinations of such functions.

Having thus introduced one suitable but non-limiting technical context for the practice of the exemplary embodiments of this invention, the exemplary embodiments will now be described with greater specificity.

Figure 2:
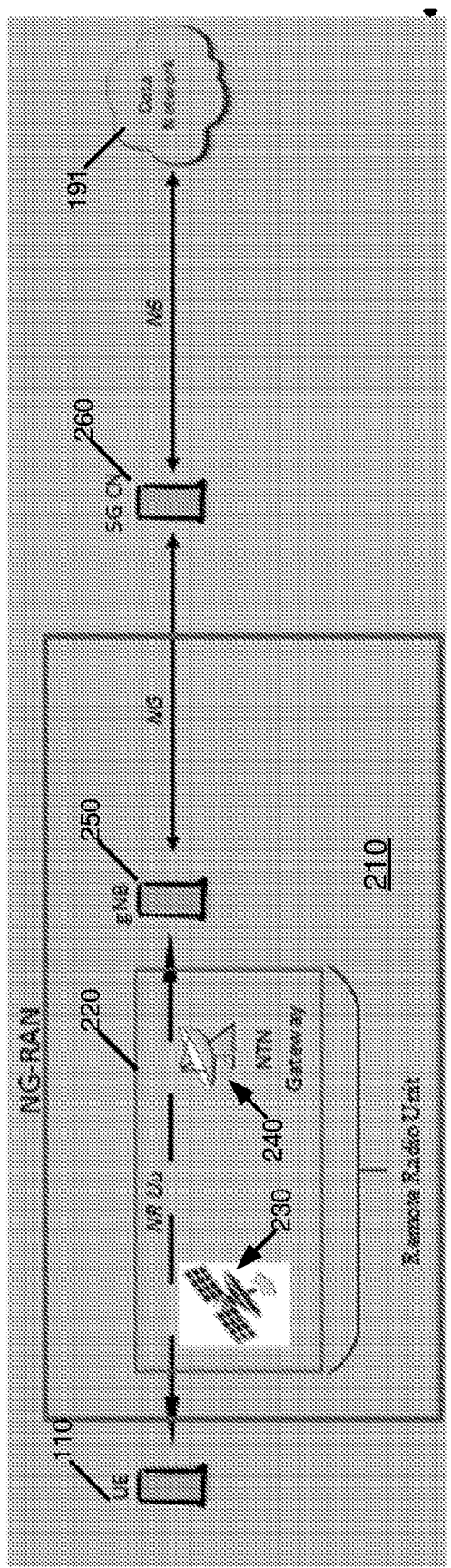
FIG. 2 shows a networking-RAN architecture with transparent satellite.

Referring to FIG. 2, the UE 110 communicates with remote radio unit 220 of the NG-RAN 210, which also includes a gNB 250. The remote radio unit 220 includes a transparent satellite 230 and an NTN gateway 240. The UE 110 communicates via an NR Uu interface with the gNB 250. There is a 5G Core Network (CN 260 communicating via an NG interface, and the 5G CN communicates with the data network 191 via another NG interface. It should be noted that this is one example, and the exemplary embodiments herein are also valid for the regenerative case. For instance, the exemplary embodiments also apply to other architecture options, for example, the regenerative satellite based NG-RAN architectures described in 3GPP TR 38.821, FIG. 5.2.1-1, which has the following title: Regenerative satellite without ISL, gNB processed payload.

For a Feeder Link Switch, during NTN operation, it may become necessary to switch the feeder link (SRI) between different NTN GWs toward the same satellite. This may be due to e g maintenance, traffic offloading, or (for LEO) due to the satellite moving out of visibility with respect to the current NTN GW. The switchover should be performed without causing service disruption to the served UEs. This can be done in different ways according to the NTN architecture option deployed.

Figure 3:
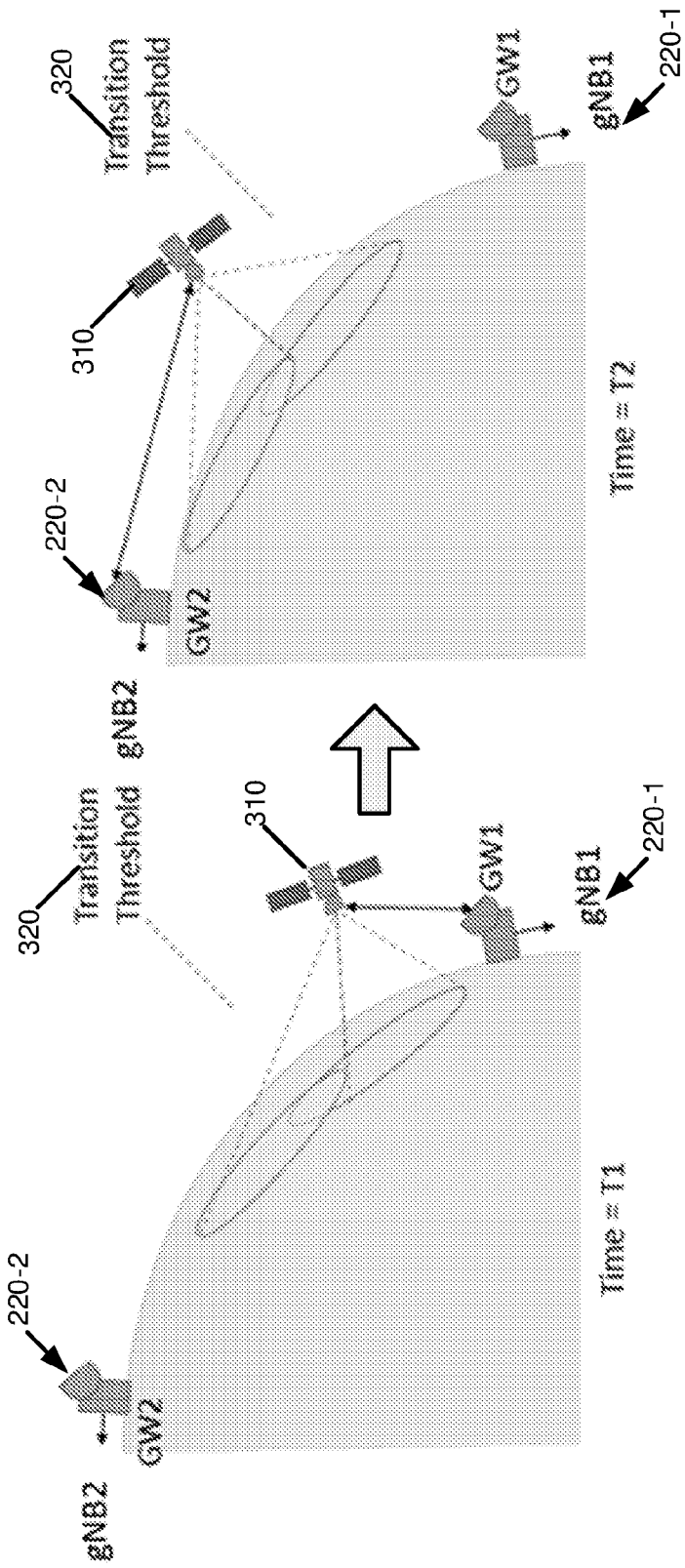
FIG. 3 shows a feeder link switch-over for transparent LEO NTN, as per 3GPP TR 38.821.

FIG. 3 shows the feeder link switch-over for transparent LEO, when only one feeder link is available at a time for the satellite. This figure is also a representation of an Earth-moving satellite. As seen from the figure, in the transparent case, the gNB is on Earth thus there will be a switch from gNB1 to gNB2. That is, the satellite 310 at time=T1 is served by a feeder link from RAN 220-1 and gNB1, and as the satellite 310 passes the transition threshold 320 and is illustrated at time=T2, the satellite is served by a feeder link from RAN 220-2 and gNB2. If the satellite can be served by one feeder link at a time, it means that, with Rel-15 NR assumptions, the RRC connection for the UEs served by the gNB1 (via GW1) needs to be dropped. After gNB2 (via GW2 of RAN 220-2) takes over, the UEs (not shown in this figure) may be able to find the reference signals corresponding to gNB2 and perform initial access on a cell belonging to gNB2.

Figure 4:
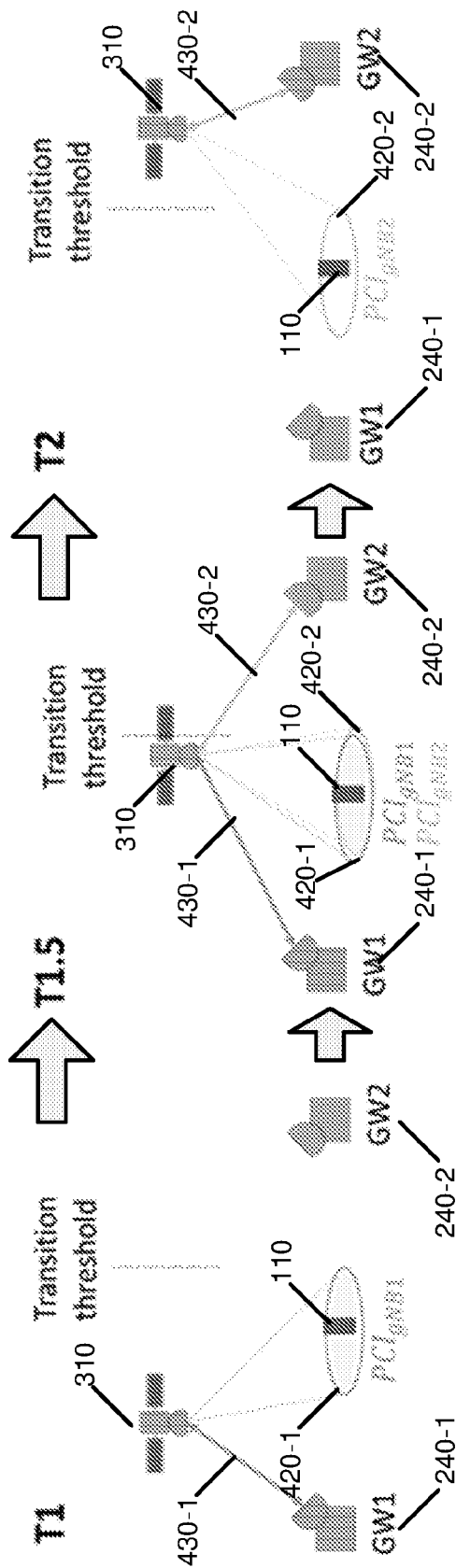
FIG. 4 shows a feeder link switch-over for LEO transparent satellite with two feeder links serving the satellite during the switch.

FIG. 4, shows one possible solution to enable service continuity for feeder link switch-over, when (at least) two feeder links are available for the satellite. That is, this example is unlike the example in FIG. 3, where there was no service continuity for the switch-over between GW1 and GW2. Note that this figure is also a representation of an Earth-fixed satellite. In this example, there is service continuity between GW1 and GW2. At time T1, the satellite 310 is approaching the geographical location where the transition (see transition threshold 320) to be served by the next GW 240-2 will happen, and the UE uses $PCI_{gNB1}$. At time T1.5, the satellite is served by two GWs 240-1 and 240-2, and the UE uses $PCI_{gNB1}$ and $PCI_{gNB2}$. At time T2, the transition to next GW 240-2 is finished, and the UE uses $PCI_{gNB2}$.

In additional detail, at time T1, the GW1 240-1 uses link 430-1 to communicate with the satellite 310, which creates a cell 420-1 that services the UE 110. At time T1.5, the GW2 240-2 uses link 430-2 to communicate with the satellite 310, which creates a cell 420-2 to service the UE 110. At time T1.5, there are overlapping cells 420-1, 420-2 to serve the UE 110. At time T2, only the cell 420 serves the UE 110 via the satellite 310 and the GW2 240-2.

After the feeder link switch, the geographical area will be served by a different cell from gNB2. This new cell will use a different PCI (illustrated as $PCI_{gNB2}$).

In a terrestrial network, self-configuration (including ANR) is developed to relieve the operator from the burden of manually managing Neighbor Cell Relations (NCRs). The terrestrial network's cells are almost fixed, i.e., once a cell is deployed, it will be operational for a very long time. Out of service is very infrequent, e.g., cells go offline for maintenance for a few minutes every year. The neighbor relationship is almost fixed.

However, in a Non-Terrestrial Network, e.g., with LEO/HAPS, the cells serving a specific geographical area keep changing due to, e.g., moving beams, feeder link switches, and the like. This causes one or more of the following issues.

a) Unnecessary measurements: A serving cell (e.g., a terrestrial cell) may ask a UE to perform a measurement for an NTN cell of Satellite #1 that is moving out of the area soon. While UE typically measures cells and will report the measurements if they fulfill certain conditions, which are set by the serving cell, the serving cell may ask the UE to measure certain cells. Thus, a terrestrial serving cell may ask a UE to measure an NTN cell that is its neighbor.

b) Unnecessary handover: A serving cell (e.g., a terrestrial cell) may handover a UE to a NTN cell of Satellite #1 that is moving out of the area soon. After the UE is connected to the NTN cell of Satellite #1, the UE is immediately handed over to another NTN cell of Satellite #2 that is moving into the area.

c) Unnecessary cell selection/reselection: A UE may unnecessarily select/reselect a NTN cell of Satellite #1 that is moving out of the area soon. The UE may have to perform another cell selection/reselection for an NTN cell of Satellite #2 that is moving into the area.

Figure 5:
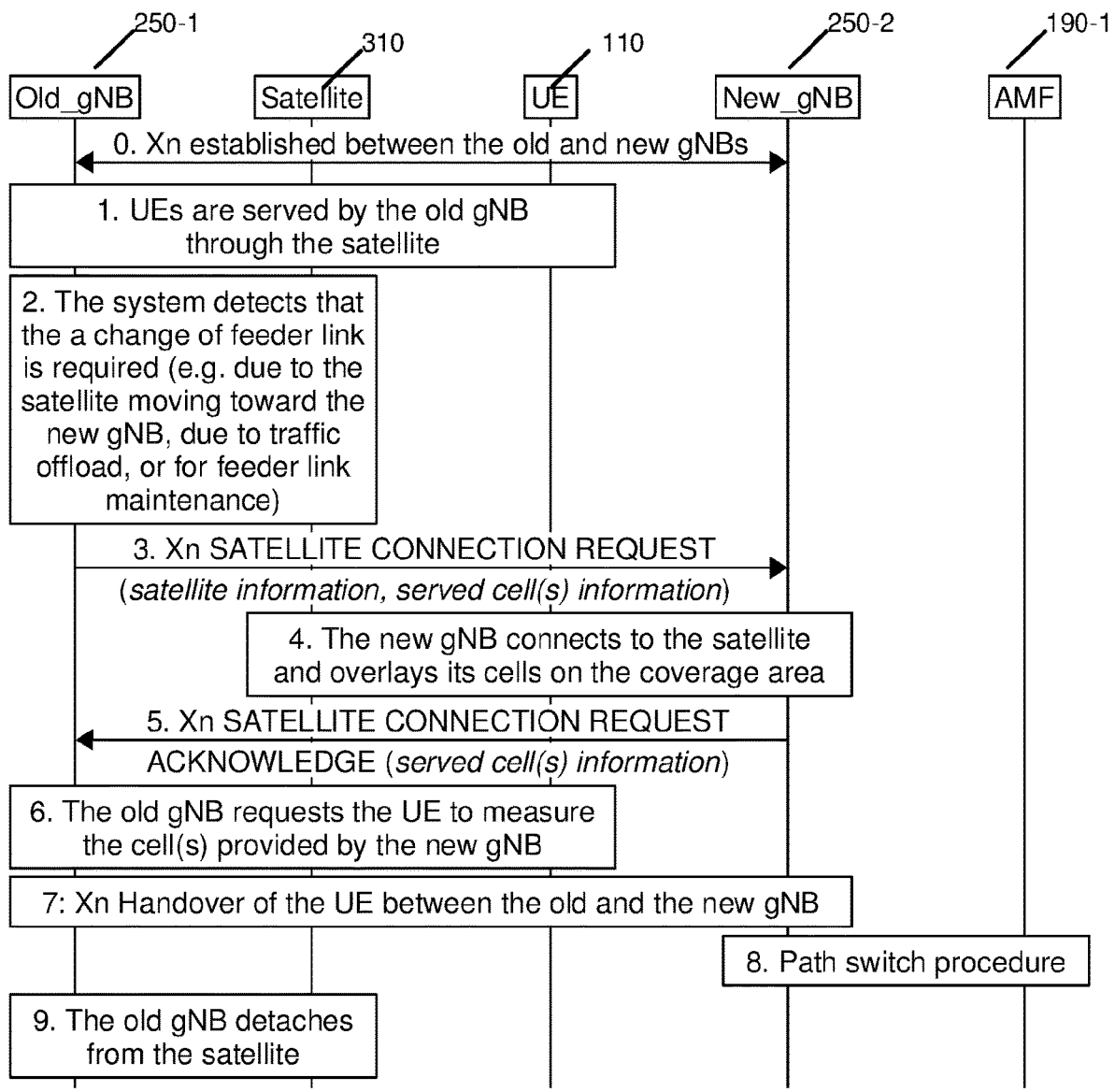
FIG. 5 shows a call flow for a feeder link switch over procedure for transparent LEO satellite.

In FIG. 5, the entities involved are an old gNB (Old_gNB) 250-1, a satellite 310, a UE 110, a new gNB (New_gNB) 250-2 and an AMF 190-1. In step 0 (zero), there is an interface Xn established between the old and new gNBs. In step 1, the UEs 110 are served by the old gNB 250-1 through the satellite 310. In step 2, the system detects that the change of feeder link is required (e.g. due to the satellite 310 moving toward the new gNB 250-2, due to traffic offload, or for feeder link maintenance).

In step 3, there is an Xn SATELLITE CONNECTION REQUEST with (satellite information, served cell(s) information). In step 4, the new gNB 250-2 connects to the satellite 310 and overlays its cells on the coverage area. In step 5, there is an Xn SATELLITE CONNECTION REQUEST ACKNOWLEDGE with (served cell(s) information). In step 6, the old gNB 250-1 requests the UE 110 to measure the cell(s) provided by the new gNB 250-2. In step 7, there is an Xn handover of the UE between the old gNB 250-1 and the new gNB 250-2. In step 8, a path switch procedure is performed between the new gNB 250-2 and the AMF 190-1. In step 9, the old gNB 250-1 detaches from the satellite 310.

The operations in FIG. 5 do not adequately address the unnecessary measurements, unnecessary handovers, and unnecessary cell selection/reselection issues described previously.

By contrast, the exemplary embodiments herein propose methods to reduce the unnecessary UE mobility events and signaling related to a Non-Terrestrial Network. As an overview, exemplary embodiments propose one or more of the following elements:

1) Exchange of information between one gNB and a second gNB indicating a validity time of the first gNB's cells to be considered as handover candidate of the cells of the second gNB.

i) The validity time is specified for group of (one or more) cells or, alternatively, for at least one of the cells in a pre-determined geographical area.

ii) The validity time values for the different neighbor relations between cells can be pre-configured in one or more of the cells; the timers are activated (triggered) using signaling, for example, via the signaling over Xn interface.

2) Additionally, in the RRC message sent to the UE, indication may be used of the validity time for the configured measurement objects.

i) Alternatively, the validity time can be broadcasted to the UEs through a System Information Broadcast (SIB) message.

3) The validity time may also be applied to cells subject to cell (re)-selection for RRC Inactive/Idle UEs.

4) Exchanging the validity time between the gNBs may also be performed per UE, e.g., during the Xn or N2 handover preparation procedure, or during the Xn secondary node addition procedure for Dual-Connectivity. The following are possible options using handover preparation as an example.

i) The source gNB may include the UE's location information in the HANDOVER REQUEST message to a candidate gNB (i.e. a satellite gNB).

ii) The candidate gNB may estimate the validity time that the candidate gNB can serve the UE if the handover is performed.

iii) The candidate gNB may send the validity time back to the source gNB in, e.g., the HANDOVER REQUEST ACKNOWLEDGE message.

iv) The source gNB may also consider the validity time when determine the right target cell.

For example, the source gNB may initiate the handover preparation to other satellite gNBs in case the replied validity time from the first candidate is too short, or the source gNB may initiate multiple parallel handover preparation procedure, then select the target gNB. In another example, the source gNB may select the cell with longer validity time as the target cell, if other conditions/parameters (e.g., cell load, radio channel conditions) are similar for the candidate cells.

The above signaling per UE can be enhanced such that the signaling is performed per group of UEs, where UEs are grouped based on their location.

It is noted that the exemplary embodiments are applicable to both transparent and non-transparent configurations. Transparent in NTN means that it is transparent to the satellite, i.e., the gNB is on the ground and the signals are routed through the satellite, but the main thing the satellite does is amplify and potentially change the frequency. Scheduling, Radio Resource Management (RRM), and the intelligence, related to the radio network, stays on the ground in the gNB. The exemplary embodiments are also applicable for transparent as for non-transparent (regenerative) configurations, where the gNB or part of the gNB (for example, the gNB-DU) are implemented on the satellite.

Additionally, although primary emphasis is placed herein on NTN scenarios, terrestrial uses are also possible. As an example, one exemplary proposal is to use exemplary embodiments herein for a planned removal of a terrestrial gNB. During or in response to the planned removal, the terrestrial gNB may inform the neighbor gNB(s) that the terrestrial gNB will be unavailable for a period, e.g., by using the validity time information described herein and the corresponding techniques for handovers or other transferal of UEs to the neighbor gNB(s).

Now that an overview has been provided, additional details are presented.

Figure 6:
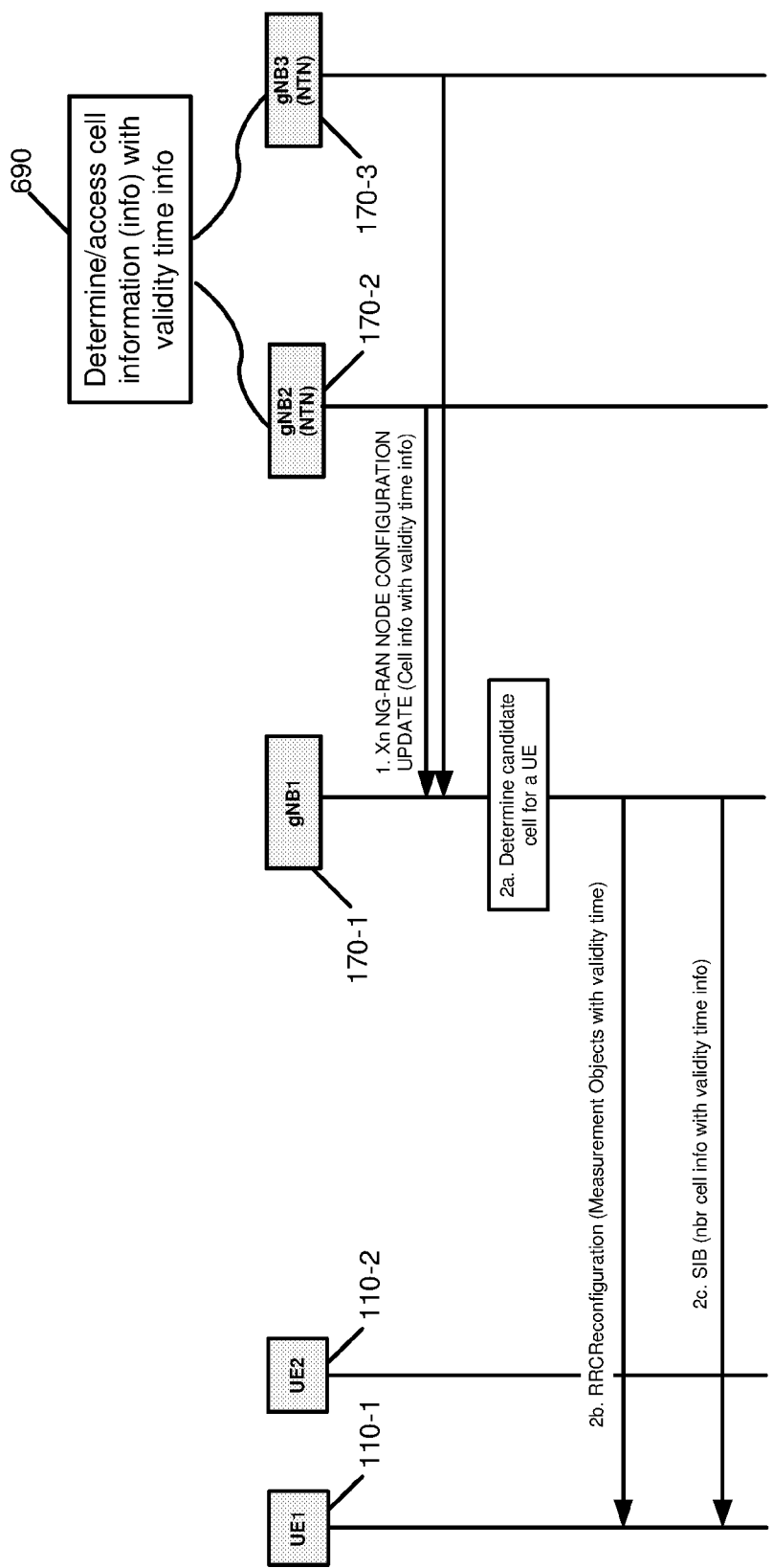
FIG. 6 is a call flow of an exemplary embodiment, where the validity time information from gNB2 to gNB1 is included in the Xn NG-RAN NODE CONFIGURATION UPDATE, in accordance with an exemplary embodiment.

Turning to FIG. 6, this figure is a call flow of an exemplary embodiment, where the NTN satellites use Earth-fixed beams. Two UEs 110-1 and 110-2 are illustrated, as is a gNB1 170-1. In this example, the gNB2 170-2 and gNB3 170-3 are Non-Terrestrial Network (NTN) gNBs, and gNB1 170-1 is either a terrestrial network gNB or another NTN gNB. An NTN gNB is a gNB serving in an NTN, i.e., it is a gNB either on a flying object (e.g., satellite/HAPS, regenerative case) or its signal is transferred through a satellite/HAPS (transparent case). The non-terrestrial network gNB 170-1 may be preconfigured with the information of the satellite, but the terrestrial network gNB 170-1 is not needed to be preconfigured with the satellite information.

In a first example, as illustrated by FIG. 6, the satellite uses an Earth-fixed beam. The satellite's beam is steered to cover a geographical area for a certain period, then switched to the next geographical area. Earth-fixed cells means that the cells are fixed to Earth, i.e., the cells do not move with the satellite, so the satellite constantly adjusts its beams in order to keep the coverage area. Earth-moving cells, by contrast, move with the satellite, so these cells sweep across Earth, following with the satellite movement. The validity time can be applied to multiple UEs 110 in the related area.

At the beginning of FIG. 6, UE1 110-1 and UE2 110-2 are served by gNB1 170-1. In step 1, the NTN gNBs (e.g., gNB2 170-2, gNB3 170-3) inform the gNB1 170-1 (TN or NTN) about the validity time information of its cells in the relevant geographical area. For example, the validity time information is related to a certain area, which can be described as a vertex of latitude and longitude, or as any other type of Geographical Area Description. This is based on a determination or accessing of cell information (info) with validity time information, in block 690.

In one example, this may be implemented by adding the validity time information in the existing Served Cell Information. The validity time information may be transferred via a non-UE-Associated XnAP procedure, for example, the Xn Setup procedure, or NG-RAN node Configuration Update procedure, or any other Xn AP procedures. In this example, the validity time information is transferred via the Xn NG-RAN NODE CONFIGURATION UPDATE message during the gNB2 (or gNB3) initiated NG-RAN node Configuration Update procedure. In another example, the validity time information may be transferred via the Xn NG-RAN NODE CONFIGURATION UPDATE ACKNOWLEDGE message during the gNB1 initiated NG-RAN node Configuration Update procedure.

In another example, the validity time information may also be exchanged via other procedures, for example, the cell resource coordination procedure, or resource status reporting procedure, or mobility setting change procedure, or any other procedures. Upon the reception of the validity time information, the gNB may consider the validity time information for resource coordination, load balancing, mobility setting change, and the like.

Turning briefly to FIG. 7, this figure shows a portion of the information element (IE) for Served Cell Information NR, in an exemplary embodiment. The possible exemplary additions to this IE are as follows.

The validity time information list, which is optional (O), and has a semantics description of "Contains the validity period for this cell." The following four items are associated with this list. The validity time information item has a range between 1 and <maxnoofValTime>. That is, there can be a maximum number of validity time information items.

For a validity time information item, the following items may be present: a validity window start of an octet string of size (4), which is a UTC time for the start of the first ($1^{st}$) validity window; a validity window end of an octet string of size (4), which is a UTC time for the start of the first ($1^{st}$) validity window; and a validity period having a bit string with a size (36) and is a period to the start of the next validity window. Note that although this is illustrated as a bit string, other formats may be used, as the format is not important as long as the information is there. In another example, one or more of the above items may have an optional presence. For example, the Validity Period may not be present, which means the information indicates one Validity Window.

Similar information may also be added for, e.g., the Neighbour Information NR IE, which indicates the validity time for a neighbor NTN cell.

Alternatively, the gNB1 170-1 may be preconfigured with the validity time information, then using the triggers over the Xn interface to activate the specific pre-configured validity time counter. That is, validity time counters can be calculated beforehand and stored in the satellite. In that case, the system mainly needs to turn them on, i.e., tell whether the counters should be used or not. When the validity timer ends, the cell should not be considered anymore as a handover/reselection candidate as the cell is likely to be gone across the horizon or soon will be so.

Returning to FIG. 6, upon the reception of the validity time information of the neighbor NTN cells gNB2 and gNB3, the gNB1 170-1 may use the validity time information for multiple purposes. The following steps of 2a, 2b and 2c are three possible options, which may be alternative or combined in various combinations.

For instance, in step 2a, the gNB1 170-1 may consider the validity time of the neighboring NTN gNBs (e.g., gNB2 170-2, gNB3 170-3) when determining the candidate cell for handover. For example, the gNB1 may skip those neighboring cells that will disappear soon, even though those cells may have better signal (as perceived by the UE). As another example, the gNB1 may select the neighbor cell with longer validity time as the target cell, if other conditions/parameters are almost the same for the candidate cells. Almost the same can be determined, e.g., by the conditions/parameters being within certain threshold(s) for instance. The gNB1 may initiate the handover preparation procedure towards the selected candidate cell. When gNB1 170-1 triggers the handover by sending an RRCReconfiguration message to the UE, the RRCReconfiguration message may also include validity time information of the target cell. Upon the reception of the RRCReconfiguration message including the validity time information of the target cell, the UE may use the validity time accordingly. For example, in the conditional handover case that the UE starts the handover when a condition is met (e.g., the signal strength of the serving cell is below a threshold), the UE may receive the RRCReconfiguration message(s) for multiple candidate cells that the UE may handover to during the handover preparation phase. When the handover condition is met, the UE may consider the validity time to determine the target cell that the UE should synchronize and connect with. In particular, step 2a may be used for handover (HO), e.g., to perform a blind handover without requiring the UE to perform a measurement on neighbor cells. It is possible that gNB1 may select multiple candidate cells, and send the HO Request msg.

In step 2b, the gNB1 170-1 may also consider the validity time(s) received from gNB2 (or pre-configured) when asking a UE to perform a measurement using the indications of the measurement objects. For example, gNB1 may add those gNB2 NTN cells that will disappear soon in blackCellsToAddModList, which prevents the UE from performing a measurement on those cells.

The gNB1 may add the validity time(s) received from gNB2 (or pre-configured) associated with a blacklist, so the UEs 110 can avoid performing the measurements on those cells that will disappear soon. The gNB1 may also add the validity time(s) associated with a whitelist, so the UEs will not perform measurement beyond the validity window, but the UE can perform the measurement during the validity window. In another example, the gNB1 may also include the validity time, for example, associated with the whitelist or blacklist when send the RRC message to the UE. For example, this may be used for conditional measurement that the UE performs measurement on the neighboring cells when a certain condition is met (e.g. the signal strength of the serving cell is below a threshold). When the measurement condition is met, the UE may consider the validity time to determine the neighboring cells that the UE should perform measurement.

The validity time information may also in an exemplary embodiment include the minimum time, before the expiry of the validity window, that the UE is allowed to perform measurements.

It is noted that step 2b can be used before a HO. That is, the gNB1 may ask the UE to perform a measurement on neighbor cells.

In step 2c, the gNB1 170-1 may also add the validity time(s) received from the neighbor (nbr) cell of the NTN gNBs (e.g., gNB2 170-2, gNB3 170-3), or pre-configured, in the System Information, for example, SIB3. Step2c is similar to 2b, but involves broadcast information. The UEs 110 may consider the validity time(s) when the UEs perform cell selection/reselection, i.e., avoid those gNB2 NTN cells that will "disappear" soon.

Alternatively, the gNB1 170-1 may dynamically adjust the content of the System Information, for example, SIB3, i.e., to add the gNB2 NTN cells in the blacklist when they will disappear soon, or to add the new gNB2 NTN cells in the whitelist when they will appear soon.

It is also possible that the validity time may be included in the RRC messages for other purposes, for example, when configuring the UE for a specific setting or parameter(s) related to an NTN cell. The UE may use the validity time to determine the NTN cell that needs to apply the setting or parameter(s).

At the end of FIG. 6, the UE has now an updated list of cells, i.e., cells leaving (e.g., becoming unreachable) are removed, cells coming in view are added, and potentially a priority on cells with a long validity timer is provided. Normal handovers or other operations may be performed.

Figure 6A:
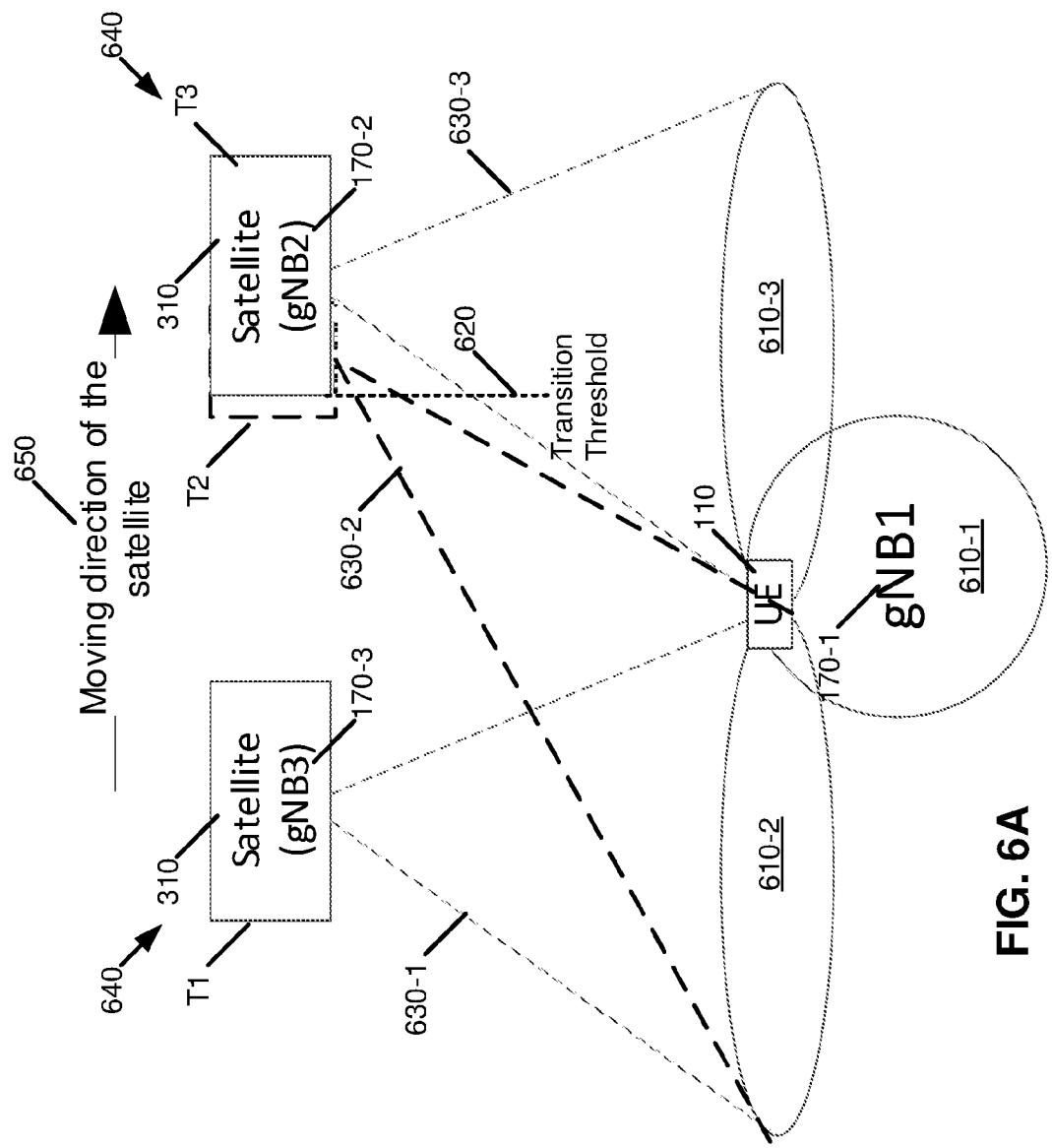
FIG. 6A is an illustration of possible switch-over between cells corresponding to FIG. 6.

FIG. 6A is an illustration of possible switch-over between cells corresponding to FIG. 6. In this example, the satellite 310, which includes the gNB3 170-3 is moving as indicated by the moving direction 650 of the satellite. The satellite 310 is one example of a non-terrestrial network node 640, and other examples are possible, such as other spaceborne or airborne nodes. This illustrates three cells: cell 610-1 (created by gNB1 170-1), cell 610-2 created by the satellite 310 from time T1 to T2; and cell 610-3 created by satellite 310 from at least time T3. The UE 110 is also shown.

Since this is an illustration of Earth-fixed beams, the cell 610-2 is fixed and the satellite 310 adjusts its beams to make that fixed cell 610-2. For instance, at time T1, the satellite 310 forms beam 630-1, and at time T2, the satellite 310 forms beam 630-2. At some point, indicated by the transition threshold 620, the satellite can no longer form the cell 610-2 and instead forms the cell 610-3, which would continue to be formed for a while until another transition threshold (not shown) is reached. In this example, the gNB2 170-2 is illustrated as being associated with the cell 610-3. There is a "jump" between the two cells 610-2 and 610-3, which occurs at the transition threshold 620.

Figure 8:
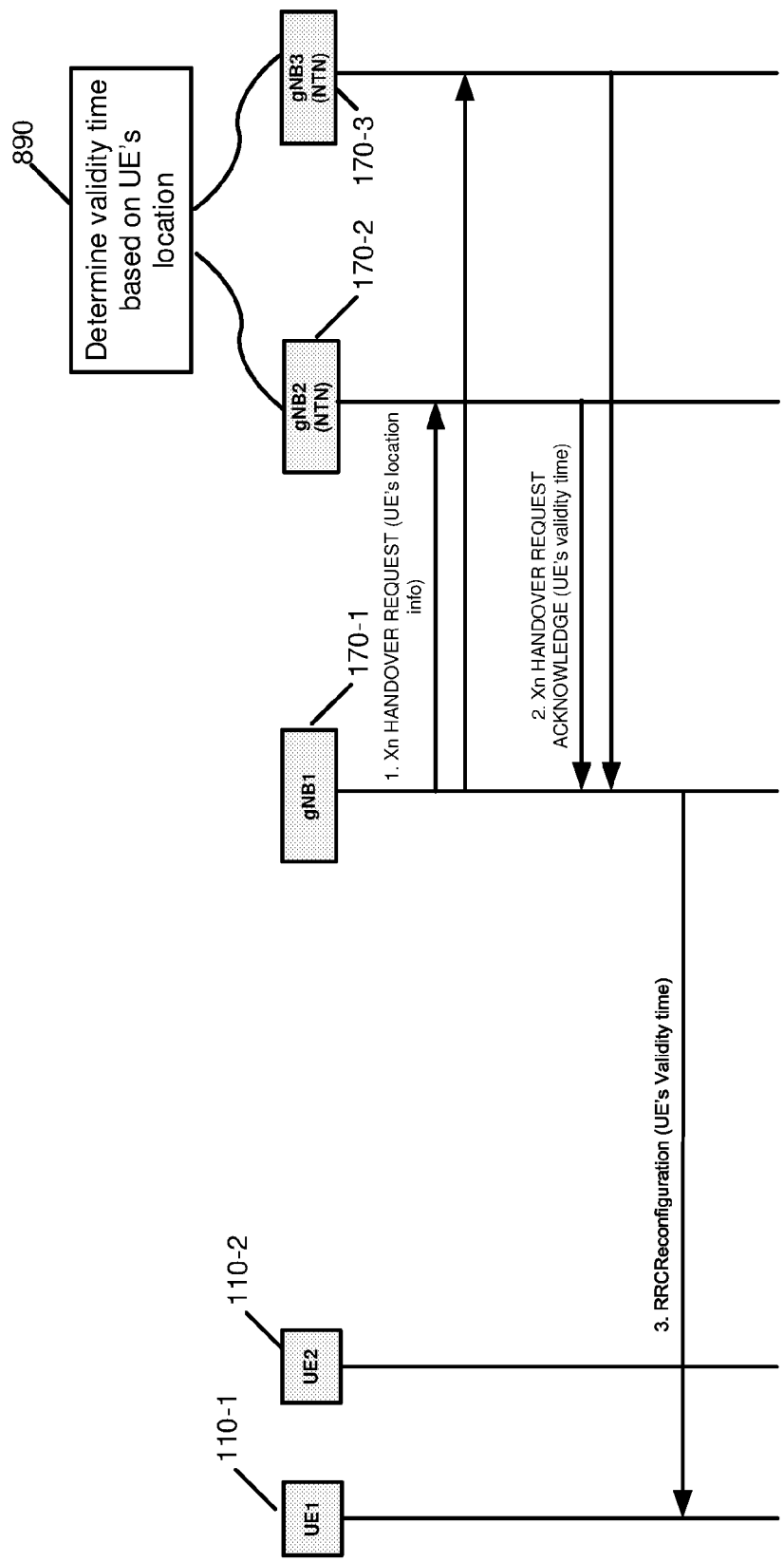
FIG. 8 illustrates another signaling flow proposal for the validity time information from gNB2 to gNB1 is included in the Xn HANDOVER REQUEST ACKNOWLEDGE message, in accordance with an exemplary embodiment.

In a second example, the satellite uses an Earth-moving beam. The validity time will be different per UE, i.e., depending on the UE's location. The validity time information may be transferred via a UE-Associated XnAP procedure, for example, the validity time is exchanged between the gNBs during the Xn handover preparation procedure. A similar proposal can apply for the N2 handover preparation procedure. This second example is illustrated by FIG. 8, which illustrates a new signaling flow proposal for the validity time information from gNB2 to gNB1 included in the Xn HANDOVER REQUEST ACKNOWLEDGE message, in accordance with an exemplary embodiment.

At the beginning of the flow, the UE1 110-1 and UE2 110-2 are served by gNB1 170-1.

In step 1, the gNB1 170-1 initiates the handover preparation procedure. The gNB1 may initiate multiple handover preparation procedures in parallel, or in sequence. The HANDOVER REQUEST message includes the UE's geographical location information. The HANDOVER REQUEST message may also include the UE's other mobility information, for example, moving speed, moving direction, and the like, which are provided by the UE via RRC signaling.

When the UE has GNSS capability, the UE's location is provided to the gNB1 via, e.g., an RRC procedure. When the UE does not have GNSS capability, the NTN gNB1 may determine the UE's geographical location.

Responsive to this, the gNB2 and gN3 determine (block 890) validity time based at least on the UE's location. This uses the known or determined cell information.

In step 2, the satellite gNB (e.g., gNB2 170-2) determines the validity time based on the received UE's location information and satellite ephemeris data. gNB2 170-2 replies with the HANDOVER REQUEST ACKNOWLEDGE (Ack) message including the validity time information. gNB2 170-2 may also include the validity time, which assists the UE to take some further actions, in the RRC message, for example, the RRCReconfiguration message to the UE. The validity time information message is included in the Target NG-RAN node To Source NG-RAN node Transparent Container of the HANDOVER REQUEST ACKNOWLEDGE message. As for gNB3 170-3, in this example, this gNB may or may not reply. The gNB3 should reply if the gNB3 is considered as a candidate, such as if there is selection performed in gNB1 based on the validity times provided by gNB2 and gNB3. Also, in case of a conditional HandOver configuration for the UE, both gNB2 and gNB3 should reply to gNB1.

gNB1 may determine whether to continue the handover. For example, if the replied validity time is too short, gNB1 may decide to select another candidate cell or skip the handover. In case multiple handover preparation procedures are performed, gNB1 may consider the replied validity time to select the target cell and continue the handover. gNB1 may initiate a Handover Cancel procedure to cancel the handover preparation in other cells.

In step 3, the gNB1 170-1 triggers the handover by sending the RRCReconfiguration message to the UE. The RRC message also includes the validity time, which assists the UE to take some further actions.

Possible results of FIG. 8 include at least the following. If the gNB1 has decided that the validity timer of gNB2 is too short and gNB3 is a better candidate, then a HO could be performed to gNB3. Otherwise, a HO could be performed to gNB2.

A further scenario for the Dual-Connectivity (DC) is as follows. Assume the NTN gNB cell is added as a secondary node for the UE. The below exemplary process is similar to FIG. 8, with one main difference being the related Xn procedure.

Step 1: The gNB1 initiates the S-NG-RAN node Addition Preparation procedure. The XnAP message, for example, the Xn S-NODE ADDITION REQUEST message, includes the UE's location information.

Step 2: The gNB2 replies with the validity time in the XnAP Acknowledge message, for example, the Xn S-NODE ADDITION REQUEST ACKNOWLEDGE message. The gNB1 considers the validity time to determine whether the gNB2 is an appropriate cell for the secondary node.

In another example, the UE's Geographical information and the NTN cell's validity time information may also be transferred during other procedures, for example, the M-NG-RAN node-initiated S-NG-RAN node Modification Preparation.

The rest of FIG. 8 may be followed.

Figure 8A:
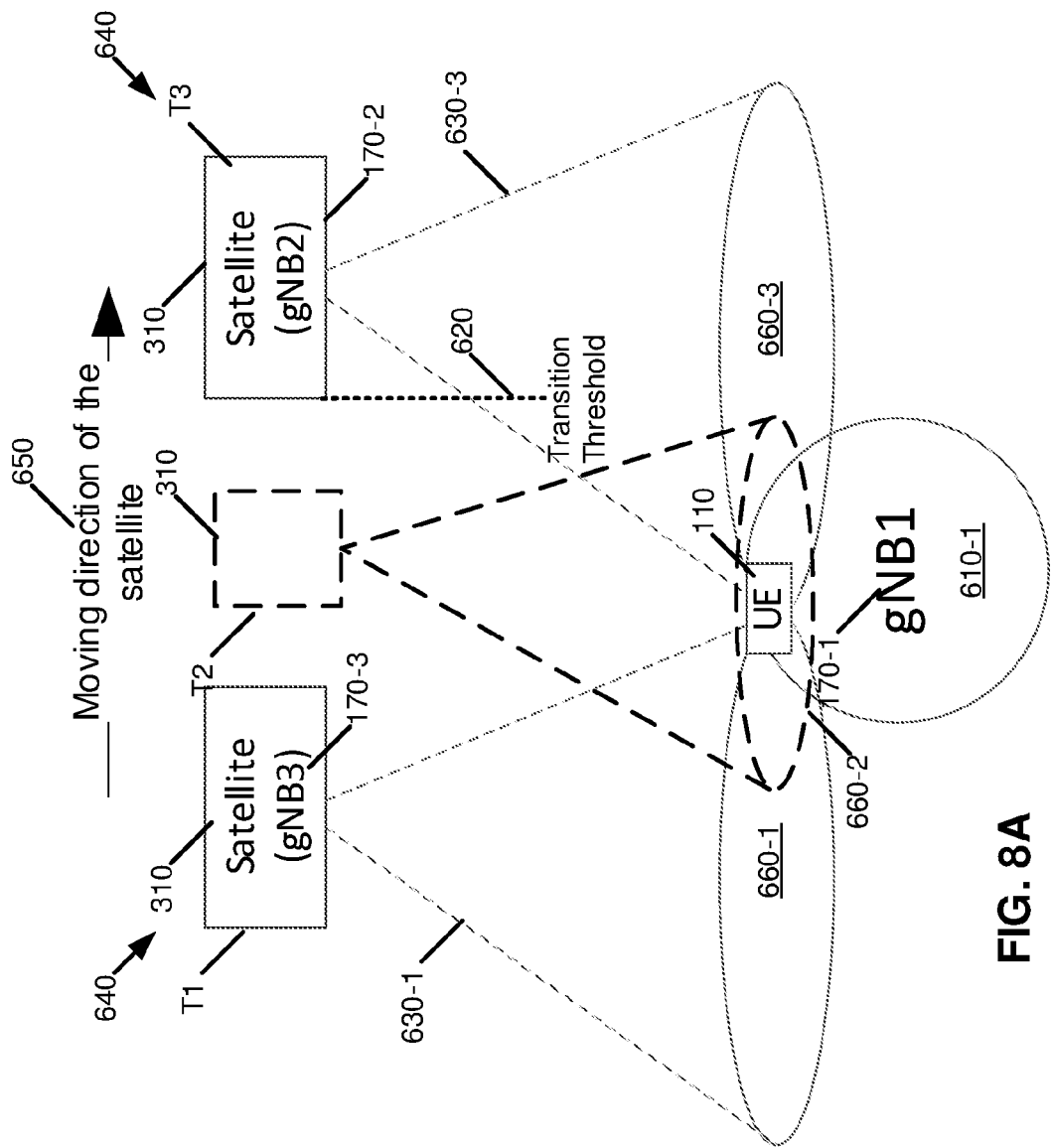
FIG. 8A is an illustration of possible switch-over between cells corresponding to FIG. 8.

FIG. 8A is an illustration of possible switch-over between cells corresponding to FIG. 8. In this example, the satellite 310, which includes the gNB3 170-3 is moving as indicated by the moving direction 650 of the satellite. The satellite 310 is one example of a non-terrestrial network node 640, and other examples are possible, such as other spaceborne or airborne nodes. This illustrates four cells: cell 610-1 (created by gNB1 170-1), cell 660-1 created by the satellite 310 at time T1; cell 660-2 created by the satellite 310 at time T2; and cell 660-3 created by satellite 310 at time T3. The UE 110 is also shown.

Since this is an illustration of Earth-moving beams, the cell 660 moves as the satellite 310 moves. For instance, at time T1, the satellite 310 forms beam 660-1, and at time T2, the satellite 310 forms beam 660-2, and at time T3, the satellite forms beam 660-3. In this example, the gNB3 170-3 is illustrated as being associated with the cell 660 until the transition threshold 620, and then the gNB2 170-2 is associated with the cell 660. For example, at time T3, the gNB2 170-2 is associated with the cell 660-3. There is a smooth transition between cells 660-1 and 660-3, which occurs at the transition threshold 620.

Figure 9:
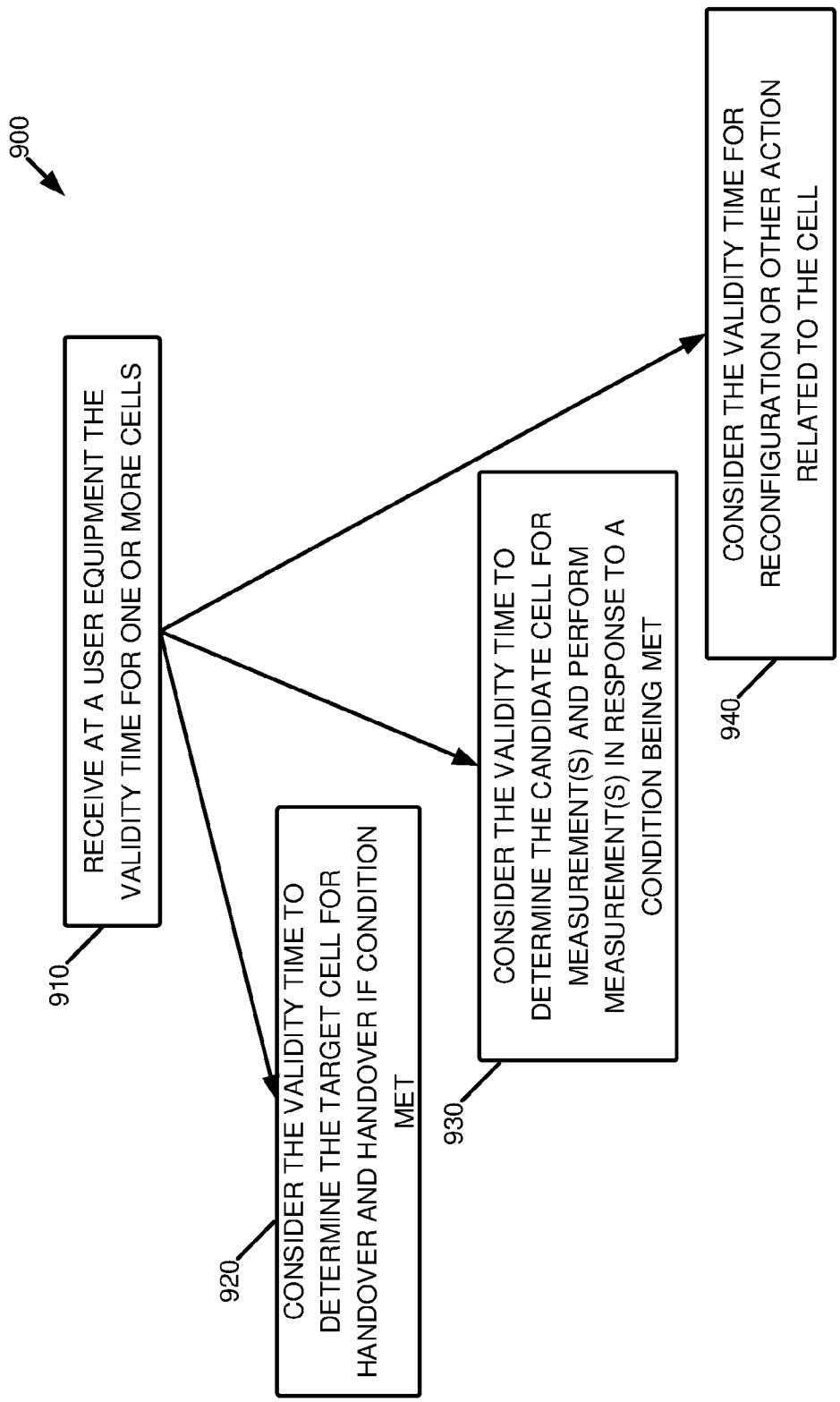
FIG. 9 illustrates a flow chart of a method performed by a user equipment in accordance with example embodiments.

FIG. 9 illustrates a flow chart of a method 900 in accordance with example embodiments of the present disclosure. FIG. 9 also illustrates the operation of an exemplary method or methods, a result of execution of computer program instructions embodied on a computer readable memory, functions performed by logic implemented in hardware, and/or interconnected means for performing functions in accordance with exemplary embodiments. The method 900 may be implemented at any UE. The implementation may be by the UE under control of the control module 140. Only for the purpose of illustrations, the method 900 is described to be implemented at the UE1 110-1 and UE2 110-2 in FIG. 6.

At block 910, the UE 110 receives from a base station a validity time for one or more cells. The UE 110 may also receive a list of validity time(s), where a validity time is related to one or more cells. Depend on the RRC message, the UE may take various actions. Blocks 920 to 940 indicate different possible operations undertaken by the UE 110.

At block 910, the UE receives the RRCReconfiguration message including the validity time for handover purposes. In block 920, the UE may use the validity time accordingly. For example, in the conditional handover case that the UE starts the handover when a condition is met (e.g., the signal strength of the serving cell is below a threshold), the UE may receive the RRCReconfiguration message(s) for multiple candidate cells that the UE may handover to during the handover preparation phase. When the handover condition is met, the UE may consider the validity time to determine the target cell that the UE should be synchronized and connected with. For example, the UE may select the target cell with the longer validity time, if other conditions/parameters are almost the same (e.g., within threshold(s)) for the candidate cells.

At block 910, the UE receives the RRCReconfiguration including the validity time for measurement configuration purpose. The UE may receive the validity time, for example, associated with the whitelist or blacklist. For example, this may be used in block 930 for a conditional measurement that the UE performs measurement on the neighboring cells when a certain condition is met (e.g. the signal strength of the serving cell is below a threshold). When the measurement condition is met, the UE may consider the validity time to determine the neighboring cells on which the UE should perform measurement, and to perform the measurement(s). For example, the UE may not perform measurement beyond the validity window, and may perform the measurement during the validity window.

At block 910, the UE may receive the validity time in the RRC message for other purposes, for example, when reconfiguring the UE for a specific setting or parameter related to the NTN cell. In block 940, the UE may use the validity time to determine the NTN cell that needs to apply the setting or parameters.

Figure 10:
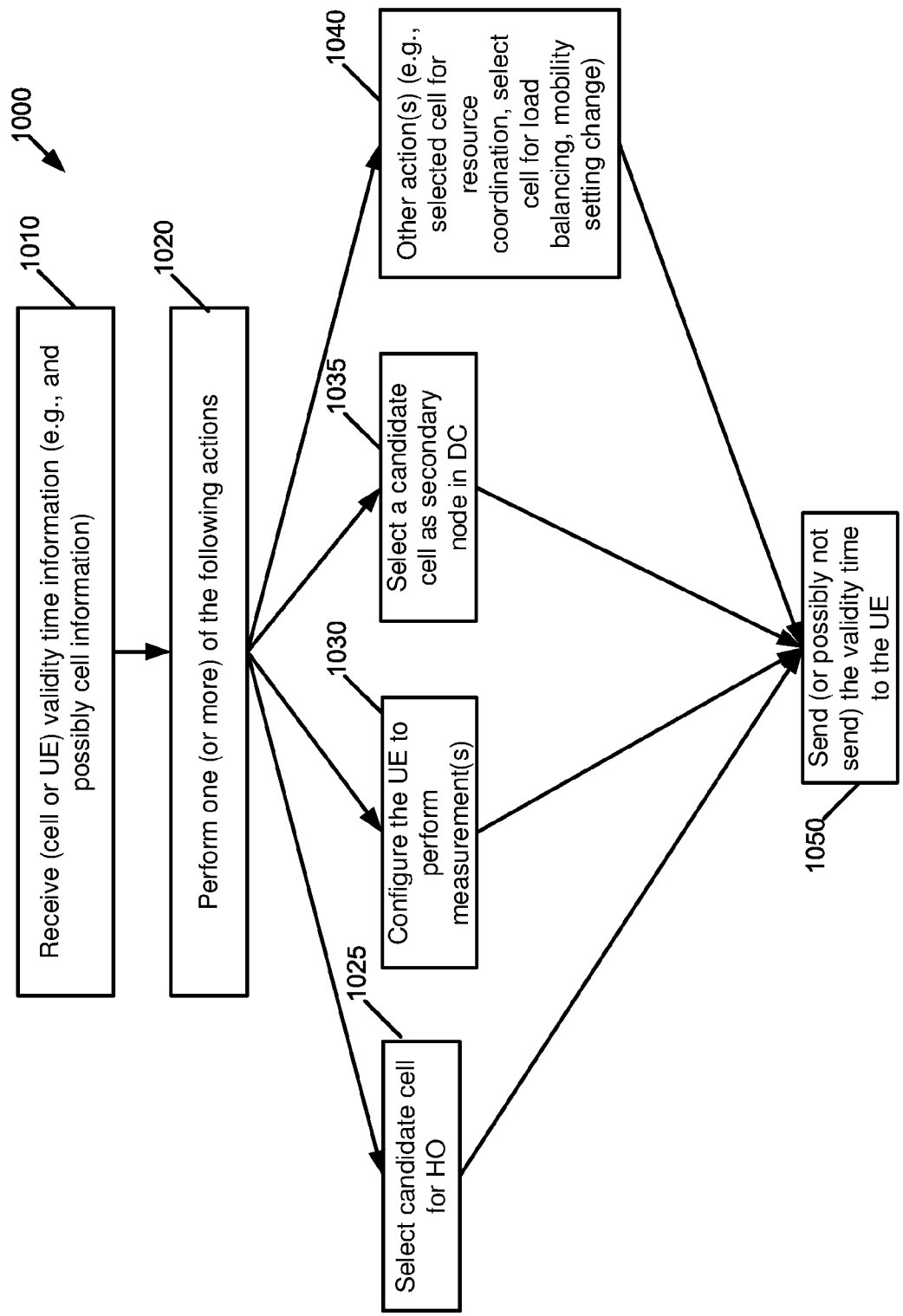
FIG. 10 illustrates a flow chart of a method performed by a base station in accordance with example embodiments.

Turning to FIG. 10, FIG. 10 also illustrates the operation of an exemplary method 1000, a result of execution of computer program instructions embodied on a computer readable memory, functions performed by logic implemented in hardware, and/or interconnected means for performing functions in accordance with exemplary embodiments. The implementation in FIG. 10 may be by the base station under control of the control module 150.

At block 1010, the base station receives the validity time for the one or more cells from another base station or multiple other base stations. This may be performed during the base station-initiated procedure or the other base station initiated procedure, for example, when the base station initiates an Xn NG-RAN NODE Configuration Update procedure, the other base station provides the validity time for one or more of its cells when replying to the base station. The other base station may also provide the geographical area information for one or more of its cells, as well as the neighboring cells of this base station. In this case, the validity time may be specific to one or more cells.

In another example, the base station may provide the UE's location information to the other base station. For example, when the base station initiates a handover preparation procedure towards the other base station, the base station may include the UE's location information in the handover request message to the other base station. The other base station may determine the validity time for one or more of its cells in considering the UE's location. The other base station provides the validity time to the base station in the response message. In this case, the validity time may be specific to a UE.

At block 1020, the base station may take various actions on the received validity time from other base stations. For instance, at block 1025, the base station may consider the validity time when determining the candidate cell for handover. For example, the base station may skip those neighboring cells that will disappear soon, even though those cells may have better signals (as perceived by the UE). As another example, the base station may select the neighbor cell with a longer validity time as the target cell, if other conditions/parameters are almost the same for the candidate cells. By almost the same, this means, e.g., within some threshold(s).

As another example, at block 1030, the base station may consider the validity time when configuring the measurement for a UE. For example, the base station may add those NTN cells that will disappear soon into a black list, which prevents the UE from performing a measurement on those cells.

As a further example, at block 1035, the base station may consider the validity time when determining the secondary cell for the UE during dual-connectivity operation. For example, the base station may skip those neighboring cells that will disappear soon, even though those cells may have a better signal (as perceived by the UE). As another example, the base station may select the neighbor cell with a longer validity time as the secondary cell, if other conditions/parameters are almost the same for the candidate cells.

As an additional example, at block 1040, the base station may consider the validity time for other actions. For example, the base station may consider the validity time information for the cell resource coordination procedure, or resource status reporting procedure, or mobility setting change procedure, or any other procedures.

At block 1050, the base station may also send the validity time to the UE. This can be used in scenarios when the handover, or measurement, or reconfiguration, or any other action can be applied to the UE later, for example, when a certain condition is met. It is also possible the base station might not send the validity time to the UE under certain scenarios.

Without in any way limiting the scope, interpretation, or application of the claims appearing below, a technical effect of one or more of the example embodiments disclosed herein is avoidance of preconfiguring the neighbor gNB (e.g., a terrestrial network gNB) with a large set of possible NTN cell lists. Another technical effect and advantage of one or more of the example embodiments disclosed herein is avoiding preconfiguring the UE to have the NTN cell information, which may change. Another technical effect and advantage of one or more of the example embodiments disclosed herein is avoiding a UE performing handover to a cell, which will only be available for a short period of time.

The following are additional exemplary embodiments.

Example 1. A method, comprising:

receiving, at a base station serving one or more user equipment, validity time information for one or more cells formed by one or more other base stations, the validity time information indicating at least a time period when corresponding cells are available for use by the one or more user equipment; and determining one or more actions to perform for the one or more user equipment based on the validity time information.

Example 2. The method of example 1, wherein the validity time information indicates time periods during which corresponding cells are able to provide coverage to the one or more user equipment.

Example 3. The method of example 2, further comprising receiving cell information corresponding to the one or more cells formed by one or more other base stations, wherein the cell information comprises indication of geographical areas in which corresponding cells are able to provide the coverage to the one or more user equipment.

Example 4. The method of any of examples 2 or 3, wherein the validity time information for a cell indicates one or more of a starting time of a validity window, an ending time of the validity window, or a period to the next validity window for the cell.

Example 5. The method of any of examples 1 to 4, wherein the determining one or more actions to perform further comprises performing at least one of the following actions:

the base station selecting one or more candidate cells from the one or more cells for the user equipment as handover candidates;

the base station configuring the user equipment to perform a measurement of the selected one or more cells;

the base station selecting a candidate cell from the one or more cells for the user equipment as a secondary node; or the base station selecting one or more candidate cells from the one or more cells for resource coordination, or load balancing, or a mobility setting change.

Example 6. The method of example 5, wherein the performing at least one of the following actions further comprises:

sending by the base station indication of the validity time information toward the user equipment, including the indication of the validity time information for a selected cell with signaling indicating the user equipment is allowed to perform handover to the selected cell, or sending by the base station indication of the validity time information toward the user equipment, including the indication of the validity time information for the selected one or more cells with signaling indicating the user equipment should perform measurements of the selected one or more cells, or sending by the base station indication of the validity time information toward the user equipment, including the indication of the validity time information for a selected cell with signaling indicating the selected cell is to be added as a secondary node for the user equipment.

Example 7. The method of any of examples 5 or 6, wherein the selected one or more cells are associated with a whitelist indicating the handover or measurements should be performed on the selected one or more cells.

Example 8. The method of any of examples 5 to 7, wherein a set of the one or more selected cells are excluded from performing the handover or measurements on by the user equipment.

Example 9. The method of any of examples 5 to 8, wherein the sending by the base station indication of the validity time information toward the user equipment further comprises sending by the base station indication of the validity time information in a unicast radio resource control message, or in system information.

Example 10. The method of example 1, wherein the validity time information indicates validity time of corresponding cells based on location of the user equipment and based on the corresponding cells that are able to provide coverage to the user equipment within the validity time.

Example 11. The method of example 10, further comprising, prior to receiving the validity time information, sending user equipment's location information by the base station via a request message to the one or more other base stations, and the validity time information is received in response to the sending of the request message and associated one or more other base stations determining corresponding validity time information based at least on location information of the user equipment.

Example 12. The method of example 11, wherein the request message comprises one of a handover request, or a secondary node addition request, or a resource coordination request, or a mobility change setting request, or a conditional handover request.

Example 13. A method, comprising:

receiving, at a user equipment from a base station, validity time for one or more cells formed by one or more other base stations; and performing by the user equipment one or more actions based on the validity time of the one or more cells.

Example 14. The method of example 13, wherein performing one or more actions further comprises considering the validity time to determine a target cell of the one or more cells for handover and to perform a handover to the target cell in response to at least a condition being met.

Example 15. The method of example 14, wherein the user equipment selects as the target cell a cell of the one or more cells with a longest validity time.

Example 16. The method of example 13, wherein performing one or more actions further comprises considering the validity time to determine one or more candidate cells of the one or more cells for at least one measurement and perform the at least one measurement in response to a condition being met.

Example 17. The method of example 13, wherein performing one or more actions further comprises considering the validity time for reconfiguration of a specific setting or parameter for at least one of the one or more cells.

Example 18. A computer program, comprising code for performing the methods of any of examples 1 to 17, when the computer program is run on a computer.

Example 19. The computer program according to example 18, wherein the computer program is a computer program product comprising a computer-readable medium bearing computer program code embodied therein for use with the computer.

Example 20. The computer program according to example 18, wherein the computer program is directly loadable into an internal memory of the computer.

Example 21. An apparatus comprising means for performing:
  receiving, at a base station serving one or more user equipment, validity time information for one or more cells formed by one or more other base stations, the validity time information indicating at least a time period when corresponding cells are available for use by the one or more user equipment; and
  determining one or more actions to perform for the one or more user equipment based on the validity time information.

Example 22. The apparatus of example 21, wherein the validity time information indicates time periods during which corresponding cells are able to provide coverage to the one or more user equipment.

Example 23. The apparatus of example 22, wherein the means are further configured to perform receiving cell information corresponding to the one or more cells formed by one or more other base stations, wherein the cell information comprises indication of geographical areas in which corresponding cells are able to provide the coverage to the one or more user equipment.

Example 24. The apparatus of any of examples 22 or 23, wherein the validity time information for a cell indicates one or more of a starting time of a validity window, an ending time of the validity window, or a period to the next validity window for the cell.

Example 25. The apparatus of any of examples 21 to 24, wherein the determining one or more actions to perform further comprises performing at least one of the following actions:
  the base station selecting one or more candidate cells from the one or more cells for the user equipment as handover candidates;
  the base station configuring the user equipment to perform a measurement of the selected one or more cells;
  the base station selecting a candidate cell from the one or more cells for the user equipment as a secondary node; or
  the base station selecting one or more candidate cells from the one or more cells for resource coordination, or load balancing, or a mobility setting change.

Example 26. The apparatus of example 25, wherein the performing at least one of the following actions further comprises:
  sending by the base station indication of the validity time information toward the user equipment, including the indication of the validity time information for a selected cell with signaling indicating the user equipment is allowed to perform handover to the selected cell, or
  sending by the base station indication of the validity time information toward the user equipment, including the indication of the validity time information for the selected one or more cells with signaling indicating the user equipment should perform measurements of the selected one or more cells, or
  sending by the base station indication of the validity time information toward the user equipment, including the indication of the validity time information for a selected cell with signaling indicating the selected cell is to be added as a secondary node for the user equipment.

Example 27. The apparatus of any of examples 25 or 26, wherein the selected one or more cells are associated with a whitelist indicating the handover or measurements should be performed on the selected one or more cells.

Example 28. The apparatus of any of examples 25 to 27, wherein a set of the one or more selected cells are excluded from performing the handover or measurements on by the user equipment.

Example 29. The apparatus of any of examples 25 to 28, wherein the sending by the base station indication of the validity time information toward the user equipment further comprises sending by the base station indication of the validity time information in a unicast radio resource control message, or in system information.

Example 30. The apparatus of example 21, wherein the validity time information indicates validity time of corresponding cells based on location of the user equipment and based on the corresponding cells that are able to provide coverage to the user equipment within the validity time.

Example 31. The apparatus of example 30, wherein the means are further configured to perform, prior to receiving the validity time information, sending user equipment's location information by the base station via a request message to the one or more other base stations, and the validity time information is received in response to the sending of the request message and associated one or more other base stations determining corresponding validity time information based at least on location information of the user equipment.

Example 32. The apparatus of example 31, wherein the request message comprises one of a handover request, or a secondary node addition request, or a resource coordination request, or a mobility change setting request, or a conditional handover request.

Example 33. A base station comprising any of the apparatus of examples 21 to 32.

Example 34. An apparatus comprising means for performing:
  receiving, at a user equipment from a base station, validity time for one or more cells formed by one or more other base stations; and
  performing by the user equipment one or more actions based on the validity time of the one or more cells.

Example 35. The apparatus of example 34, wherein performing one or more actions further comprises considering the validity time to determine a target cell of the one or more cells for handover and to perform a handover to the target cell in response to at least a condition being met.

Example 36. The apparatus of example 35, wherein the user equipment selects as the target cell a cell of the one or more cells with a longest validity time.

Example 37. The apparatus of example 34, wherein performing one or more actions further comprises considering the validity time to determine one or more candidate cells of the one or more cells for at least one measurement and perform the at least one measurement in response to a condition being met.

Example 38. The apparatus of example 34, wherein performing one or more actions further comprises considering the validity time for reconfiguration of a specific setting or parameter for at least one of the one or more cells.

Example 39. A user equipment comprising any of the apparatus of examples 34 to 38.

Example 40. A wireless communication system comprising an apparatus of any of examples 21 to 32 and an apparatus comprising any of the apparatus of examples 34 to 38.

Example 41. An apparatus, comprising:
one or more processors; and
one or more memories including computer program code,
wherein the one or more memories and the computer program code are configured, with the one or more processors, to cause the apparatus to perform operations comprising:
receiving, at a base station serving one or more user equipment, validity time information for one or more cells formed by one or more other base stations, the validity time information indicating at least a time period when corresponding cells are available for use by the one or more user equipment; and
determining one or more actions to perform for the one or more user equipment based on the validity time information.

Example 42. The apparatus of example 41, wherein the one or more memories and the computer program code are configured, with the one or more processors, to cause the apparatus to perform operations in any of method examples 2 to 12.

Example 43. An apparatus, comprising:
one or more processors; and
one or more memories including computer program code,
wherein the one or more memories and the computer program code are configured, with the one or more processors, to cause the apparatus to perform operations comprising:
receiving, at a user equipment from a base station, validity time for one or more cells formed by one or more other base stations; and
performing by the user equipment one or more actions based on the validity time of the one or more cells.

Example 44. The apparatus of example 43, wherein the one or more memories and the computer program code are configured, with the one or more processors, to cause the apparatus to perform operations in any of method examples 14 to 17.

As used in this application, the term "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:
3GPP third generation partnership project
5G fifth generation
5GC 5G core network
Ack or ACK acknowledge
AMF access and mobility management function
ANR automatic neighbor cell relation
ATG air to ground
CU central unit
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
FDD frequency division duplex(ing)
GEO Geostationary Earth Orbit
gNB (or gNodeB) base station for 5G/NR, i.e., a node providing NR user plane and control plane protocol terminations towards the UE, and connected via the NG interface to the 5GC
IE information element
GNSS global navigation satellite system GW gateway
HAPS high altitude platform station
HEO Highly Elliptical Orbit
HO handover
I/F interface
LEO Low Earth Orbit
LTE long term evolution
MAC medium access control
MEO Medium Earth Orbit
MME mobility management entity
nbr neighbor
NCR neighbor cell relations
ng or NG next generation
ng-eNB or NG-eNB next generation eNB
NR new radio
NTN non-terrestrial network
N/W or NW network
OAM Operation and Maintenance
PCI physical cell identifier
PDCP packet data convergence protocol
PHY physical layer
RAN radio access network
Rel release
RLC radio link control
RRH remote radio head
RRC radio resource control
RU radio unit
Rx receiver
SDAP service data adaptation protocol
SGW serving gateway
SI study item
SIB System Information Broadcast
SMF session management function
RRM radio resource management
TDD time division duplex(ing)
TN terrestrial network
TS technical specification
Tx transmitter
UE user equipment (e.g., a wireless, typically mobile device)
UPF user plane function
UTC coordinated universal time or universal coordinated time
WI work item

What is claimed is:

1. A method, comprising:
receiving, at a base station serving one or more user equipment, validity time information for one or more cells formed by, the validity time information indicating at least a time period when corresponding cells are available to be considered as a cell reselection candidate by the one or more user equipment, the validity time being determined based at least in part on a geographical area of the one or more cells;
selecting one or more candidate cells from the one or more cells, based on the validity time of the one or more cells; and
determining at least one measurement of the one or more candidate cells to be performed by the one or more user equipment based on the validity time information.

2. The method according to claim 1, wherein the validity time information indicates time periods during which corresponding cells are able to provide coverage to the one or more user equipment.

3. The method according to claim 1, further comprising receiving cell information corresponding to the one or more cells, wherein the cell information comprises indication of geographical areas in which corresponding cells are able to provide the coverage to the one or more user equipment.

4. The method according to claim 1, wherein the validity time information for a cell indicates one or more of a starting time of a validity window, an ending time of the validity window, or a period to the next validity window for the cell.

5. A method, comprising:
receiving, at a user equipment from a base station, validity time for one or more cells, the validity time being a validity time of the one or more cells to be considered as a cell reselection candidate, the validity time being determined based at least in part on a geographical area of the one or more cells;
selecting one or more candidate cells from the one or more cells, based on the validity time of the one or more cells; and
performing by the user equipment at least one measurement of the one or more candidate cells based on the validity time of the one or more cells.

6. The method according to claim 5, wherein performing one or more actions further comprises considering the validity time to determine a target cell of the one or more cells for cell reselection and to perform a cell reselection to the target cell in response to at least a condition being met.

7. The method according to claim 6, wherein the user equipment selects as the target cell a cell of the one or more cells with a longest validity time.

8. The method according to claim 5, wherein the at least one measurement is performed in response to a condition being met.

9. A base station, comprising:
one or more processors; and
one or more memories including computer program code,
wherein the one or more memories and the computer program code are configured, with the one or more processors, to cause the base station to perform operations comprising:
receiving, at the base station serving one or more user equipment, validity time information for one or more cells, the validity time information indicating at least a time period when corresponding cells are available to be considered as a cell reselection candidate by the one or more user equipment, the validity time being determined based at least in part on a geographical area of the one or more cells;
selecting one or more candidate cells from the one or more cells, based on the validity time of the one or more cells; and
determining at least one measurement of the one or more candidate cells to be performed by to perform for the one or more user equipment based on the validity time information.

10. The base station according to claim 9, wherein the validity time information indicates time periods during which corresponding cells are able to provide coverage to the one or more user equipment.

11. The base station according to claim 9, wherein the one or more memories and the computer program code are configured, with the one or more processors, to cause the base station to perform operations comprising receiving cell information corresponding to the one or more cells, wherein the cell information comprises indication of geographical areas in which corresponding cells are able to provide the coverage to the one or more user equipment.

12. The base station according to claim 9, wherein the validity time information for a cell indicates one or more of a starting time of a validity window, an ending time of the validity window, or a period to the next validity window for the cell.

13. A user equipment, comprising:

one or more processors; and one or more memories including computer program code, wherein the one or more memories and the computer program code are configured, with the one or more processors, to cause the user equipment to perform operations comprising:

receiving, at the user equipment from a base station, validity time for one or more cells, the validity time being a validity time of the one or more cells to be considered as a cell reselection candidate, the validity time being determined based at least in part on a geographical area of the one or more cells;

selecting one or more candidate cells from the one or more cells, based on the validity time of the one or more cells; and performing by the user equipment at least one measurement of the one or more candidate cells based on the validity time of the one or more cells.

14. The user equipment according to claim 13, wherein performing one or more actions further comprises considering the validity time to determine a target cell of the one or more cells for cell reselection and to perform a cell reselection to the target cell in response to at least a condition being met.

15. The user equipment according to claim 14, wherein the user equipment selects as the target cell a cell of the one or more cells with a longest validity time.

16. The user equipment according to claim 13, wherein the at least one measurement is performed in response to a condition being met.

* * * * *